(12) United States Patent
Yuzuki

(10) Patent No.: US 12,670,187 B2
(45) Date of Patent: Jun. 30, 2026

(54) INFORMATION PROCESSING SYSTEM, INFORMATION PROCESSING METHOD, AND NON-TRANSITORY COMPUTER-READABLE MEDIUM

(71) Applicant: TOYOTA JIDOSHA KABUSHIKI KAISHA, Toyota (JP)

(72) Inventor: Takahiro Yuzuki, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/043,566

(22) Filed: Feb. 3, 2025

(65) Prior Publication Data

US 2025/0252119 A1 Aug. 7, 2025

(30) Foreign Application Priority Data

Feb. 6, 2024 (JP) ................................. 2024-016451

(51) Int. Cl.
G06F 16/00 (2019.01)
G06F 16/28 (2019.01)
(52) U.S. Cl.
CPC .................................. G06F 16/285 (2019.01)
(58) Field of Classification Search
CPC ................................................... G06F 16/285
USPC ........................................................ 707/737
See application file for complete search history.

(56) References Cited

U.S. PATENT DOCUMENTS 11,868,859 B1 * 1/2024 Smith .................... G06N 20/00
707/707

11,995,401 B1 * 5/2024 Smith .................... G06F 40/40
707/707
2024/0194342 A1 * 6/2024 Patil ....................... G16H 50/70
707/707
2025/0006313 A1 * 1/2025 Nicoludis .............. G06N 20/00
707/707
2025/0053587 A1 * 2/2025 Coulter ................. G06F 21/554
707/707
2025/0217387 A1 * 7/2025 Smith ................... G06F 16/285
707/707

FOREIGN PATENT DOCUMENTS

JP 6562984 B2 8/2019

OTHER PUBLICATIONS

Mikolov et al., "Efficient Estimation of Word Representations in Vector Space," International Conference on Learning Representations, Sep. 7, 2013, URL: <https://arxiv.org/pdf/1301.3781>.

* cited by examiner

*Primary Examiner* — Alexandria Y Bromell
(74) *Attorney, Agent, or Firm* — Dinsmore & Shohl LLP

(57) ABSTRACT

An information processing system includes: data acquisition means for acquiring vector data of a plurality of dimensions; clustering means for grouping, based on relative distances between pieces of the vector data acquired by the data acquisition means, the pieces of the data in which the relative distances therebetween are close to each other, and performing hierarchical clustering for repeating the grouping; and density calculation means for calculating density of each of clusters of the pieces of the vector data. The clustering means divides or integrates the clusters based on the density of each of the clusters calculated by the density calculation means when the clustering means performs the hierarchical clustering.

12 Claims, 10 Drawing Sheets

| | K-CENTER CLUSTERING (TOP-DOWN) | HIERARCHICAL CLUSTERING (BOTTOM-UP) | IMPROVED HIERARCHICAL CLUSTERING |
|---|---|---|---|
| ADVANTAGE | NUMBER OF CLUSTERS CAN BE DETERMINED IN ADVANCE | DO NOT DEPEND ON INITIAL VALUE<br><br>CAN BE STOPPED IN MIDDLE | NUMBER OF CLUSTERS CAN BE DETERMINED IN ADVANCE<br><br>CALCULATION CAN BE STOPPED IN MIDDLE<br><br>DO NOT DEPEND ON INITIAL VALUE |
| DISADVANTAGE | DEPEND ON INITIAL VALUE<br><br>AMOUNT OF CALCULATION IS LARGE $(n \times o(n^2))$ | NUMBER OF CLUSTERS CANNOT BE DETERMINED IN ADVANCE | |

Fig. 3

CLUSTER DIVIDING
LINE ACCORDING
TO RELATED ART

CLUSTER DIVIDING
LINE ACCORDING TO
PRESENT EMBODIMENT

INFORMATION PROCESSING SYSTEM, INFORMATION PROCESSING METHOD, AND NON-TRANSITORY COMPUTER-READABLE MEDIUM

CROSS REFERENCE TO RELATED APPLICATIONS

This application is based upon and claims the benefit of priority from Japanese patent application No. 2024-016451, filed on Feb. 6, 2024, the disclosure of which is incorporated herein in its entirety by reference.

BACKGROUND

The present disclosure relates to an information processing system, an information processing method, and a program.

An information processing system including clustering means for converting input data into vector data of a plurality of dimensions and grouping, based on relative distances between pieces of the converted vector data, the pieces of the data in which the relative distances therebetween are close to each other is known (see, for example, Patent Literature 1).

Patent Literature 1: Japanese Patent No. 6562984

SUMMARY

In the aforementioned system, in order to avoid a huge combinational explosion when the relative distances between pieces of vector data are obtained, the pieces of the data in which the distances between vectors are close to each other are grouped using the K-nearest neighbor algorithm. However, when grouping is performed by specifying the number of clusterings in advance, such as a case in which the K-nearest neighbor algorithm is used, a problem that a calculation load becomes too large due to the repetitive calculations may occur.

The present disclosure has been made in order to solve the above-described problem and a main object thereof is to provide an information processing system, an information processing method, and a program that can reduce a calculation load.

In order to achieve the above-described object, one aspect according to the present disclosure is an information processing system including:

data acquisition means for acquiring vector data of a plurality of dimensions;

clustering means for grouping, based on relative distances between pieces of the vector data acquired by the data acquisition means, the pieces of the data in which the relative distances therebetween are close to each other, and performing hierarchical clustering for repeating the grouping; and density calculation means for calculating density of each of clusters of the pieces of the vector data, in which the clustering means divides or integrates the clusters based on the density of each of the clusters calculated by the density calculation means when the clustering means performs the hierarchical clustering.

In the above aspect, the clustering means may extract at least two vectors by comparing densities of vector components of the vector data of a plurality of dimensions with each other, extract from each of the extracted vectors dense parts in which vector values are dense, extract from each of the extracted vectors a region of interest onto which clustering is concentrated based on the extracted dense parts, and perform the hierarchical clustering on the extracted region of interest and a peripheral region surrounding the region of interest.

In the above aspect, when the clustering means determines that the density of each of the clusters calculated by the density calculation means is equal to or greater than a threshold, the clustering means may divide the cluster, and when the clustering means determines that the density of each of the clusters is not equal to or greater than a threshold, the clustering means may determine whether or not the current number of the clusters is equal to or greater than a target value, and then when the clustering means determines that the current number of the clusters is equal to or greater than the target value, the clustering means may stop the hierarchical clustering.

In the above aspect, when the clustering means determines that the density of each of the clusters has reached a predetermined value during the hierarchical clustering, the clustering means may temporarily stop the hierarchical clustering and output the current number of the clusters and vectors included in each of the clusters.

In the above aspect, the density may be a Gini coefficient.

In order to achieve the above-described object, one aspect according to the present disclosure is an information processing method including:

acquiring vector data of a plurality of dimensions;

grouping, based on relative distances between pieces of the acquired vector data, the pieces of the data in which the relative distances therebetween are close to each other, and performing hierarchical clustering for repeating the grouping;

calculating density of each of clusters of the pieces of the vector data; and dividing or integrating the clusters based on the calculated density of each of the clusters when the hierarchical clustering is performed.

In order to achieve the above-described object, one aspect according to the present disclosure is a program for causing a computer to:

acquire vector data of a plurality of dimensions;

group, based on relative distances between pieces of the acquired vector data, the pieces of the data in which the relative distances therebetween are close to each other, and perform hierarchical clustering for repeating the grouping;

calculate density of each of clusters of the pieces of the vector data; and divide or integrate the clusters based on the calculated density of each of the clusters when the hierarchical clustering is performed.

According to the present disclosure, it is possible to provide an information processing system, an information processing method, and a program that can reduce a calculation load.

The above and other objects, features and advantages of the present disclosure will become more fully understood from the detailed description given hereinbelow and the accompanying drawings.

BRIEF DESCRIPTION OF DRAWINGS

FIG. 3 is a diagram showing a comparison of advantages and disadvantages among a top-down method, a bottom-up method, and a method according to a present embodiment;

DESCRIPTION OF EMBODIMENTS

Figure 1:
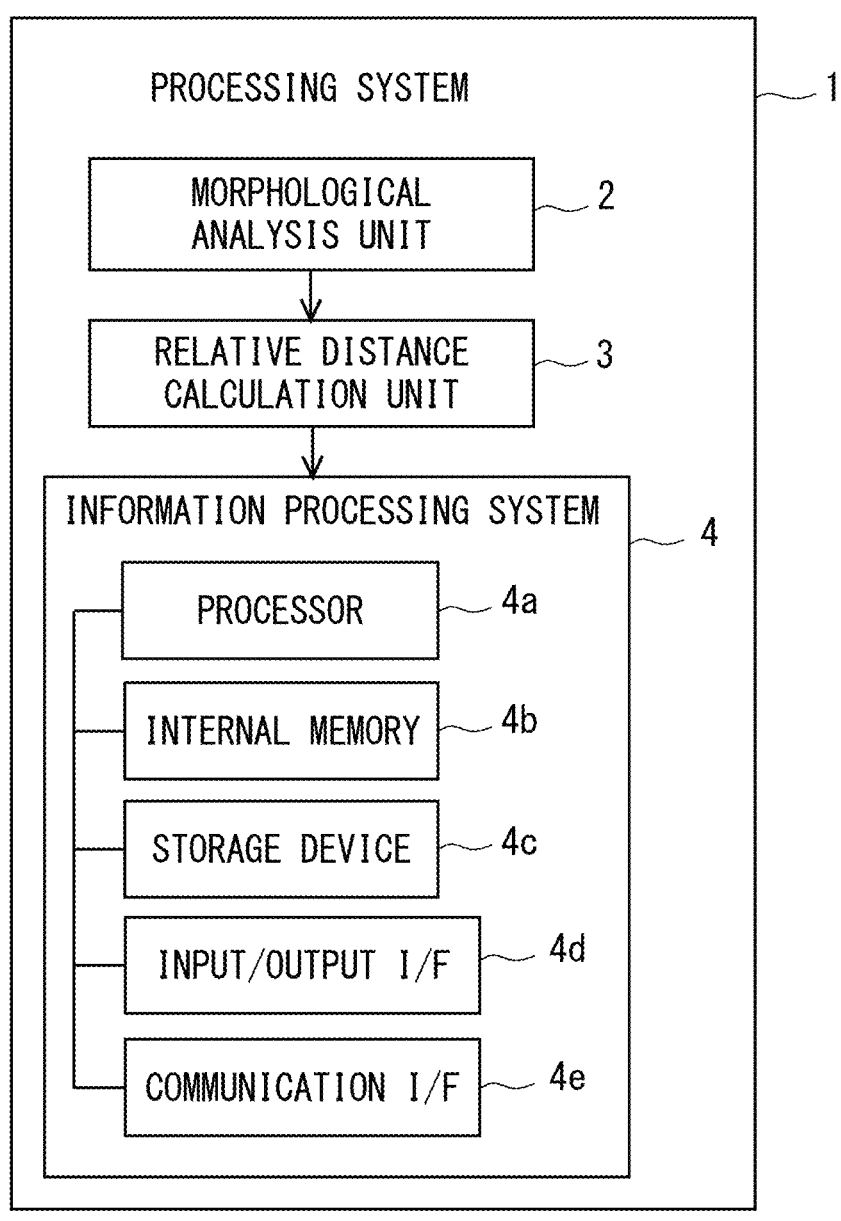
FIG. 1 is a block diagram showing a schematic system configuration of a processing system according to a present embodiment.

Embodiments according to the present disclosure will be described hereinafter with reference to the drawings.

For example, when a trained model of a large-scale language model used in document retrieval systems and generation of documents is created, a so-called clustering is performed, in which input data is converted into vector data of a plurality of dimensions, and based on relative distances between pieces of the converted vector data, the pieces of the data in which the relative distances therebetween are close to each other are grouped.

In order to avoid an explosive increase in combinations when the relative distances between pieces of the vector data are obtained, it is assumed that the pieces of the data in which the distances between vectors are close to each other are grouped using the K-nearest neighbor algorithm.

However, when grouping is performed by specifying the number of clusterings (the number of groups) in advance, such as a case in which the K-nearest neighbor algorithm is used, that is, when a so-called unsupervised clustering is used, a problem that the amount of calculation becomes enormous and a calculation load becomes too large due to the repetitive calculations may occur.

An information processing system according to this embodiment executes a processing method which solves the problem that may occur in the K-means clustering described above.

For example, in the clustering of unsupervised learning in which clustering is performed on large-scale and high-dimensional data without determining the center of the cluster in advance, the number of conceivable dimensions becomes enormous. Therefore, a situation referred to as the curse of dimensionality may occur with the result that clustering cannot be executed. In order to execute this clustering, two methods for solving the curse of dimensionality are available.

(1) Calculation is stopped when the number of clusters reaches the required number of clusters.

(2) A method that does not depend on an initial value is adopted to avoid repetitive calculations.

Taking into account the above methods (1) and (2), the information processing system according to this embodiment performs, as a method for avoiding the curse of dimensionality, an improved hierarchical clustering described below. In this embodiment, when calculation is stopped when the number of clusters reaches the required number of clusters, the density of data is focused on in order to consider "which cluster should be divided more intensively to obtain desired aggregation of clusters".

The information processing system according to this embodiment calculates each vector of a high-dimensional vector (e.g., word2vec has 200 dimensions and BERT has 768 dimensions) using a Gini coefficient that indicates the density of the vector.

When a function formed by values of the vectors is set to $L(x)$, the Gini coefficient is expressed by $1-2\int^1_0 L(x)dx$. The more uniform the data is, the closer the Gini coefficient is to zero; conversely, the denser the data is, the closer the Gini coefficient is to one.

For example, the number of words in a group 1, the number of words in a group 2, the number of words in a group 3, . . . , and the number of words in a group N included in a certain range are counted, a ratio of the number of words in each group to the total number of words is calculated, a value multiplied by the ratio is obtained (=the sum of products), and the Gini coefficient is obtained by subtracting the value from one.

As a method for obtaining the density of data, for example, a method using the center of gravity can be assumed. However, a method using the Gini coefficient, as in this embodiment, has more advantages in terms of ease of calculation. This method using the Gini coefficient only counts the number of data included in a certain group and the number of types of groups, and only requires simple four arithmetic operations (counting of the number of data, calculation of ratios, the sum of ratios, 1−the sum of products of ratios), and thus calculation is easily performed.

The information processing system according to this embodiment selects a plurality of vectors having high Gini coefficients, and performs hierarchical clustering based on values of the vectors. Note that the hierarchical clustering is a method for grouping pieces of data in which the distances between vectors are close to each other and which are highly similar to each other, and grouping them into a large group by repeating the grouping. This method makes it possible to visually understand the structure and hidden relationships of the data.

By the information processing system according to this embodiment, an increase in the calculation load can be reduced, and for example, the time for creating the same trained models can be greatly reduced. This time-reduction effect contributes to solving the time-reduction problem when a trained model of a large-scale language model is created.

Note that the problem according to this embodiment is to obtain desired feature values without exploding the amount of calculation for data of several hundred million dimensions referred to as big data. At the same time, it is necessary to appropriately compress high-dimensional data to leave the features.

The information processing system according to this embodiment prevents the amount of calculation from exploding exponentially $(o(N^2))$, and reduces it linearly $(=o(1/N))$ by stopping the calculation halfway by using the K-means clustering or the center of gravity for "clustering"

for finding the commonality between pieces of data. In this way, the required feature values can be obtained from big data.

In particular, in language data, the number of dimensions of the vector formed by one word is as large as several hundred; for example, the minimum corpus is 100,000 articles and 71,000 words. Therefore, obtaining feature values while reducing the amount of calculation can be desirable technology for retrieving and summarizing documents.

On the other hand, regarding big data, if data is present densely throughout the entire data, it is difficult to reduce the amount of calculation for observing the tendency. However, when the distribution of data is biased, e.g., data becomes sparse or dense in the entire data, it can be said that it is efficient to focus more on the calculation of the densely distributed parts and to finish the calculation of the sparsely distributed parts more lightly.

Therefore, as described above, the information processing system according to this embodiment calculates a Gini coefficient indicating the density of vectors by focusing on the density of data, selects a plurality of vectors having high Gini coefficients, and performs hierarchical clustering based on values of the vectors.

Next, an example of a hardware configuration of a processing system according to this embodiment will be described. FIG. 1 is a block diagram showing a schematic system configuration of the processing system according to this embodiment. A processing system 1 according to this embodiment includes a morphological analysis unit 2, a relative distance calculation unit 3, and an information processing system 4 described above.

Note that the information processing system 4 has, for example, a hardware configuration of a normal computer including a processor 4a such as a Central Processing Unit (CPU) or a Graphics Processing Unit (GPU), an internal memory 4b such as a Random Access Memory (RAM) and a Read Only Memory (ROM), a storage device 4c such as a Hard Disk Drive (HDD) or a Solid State Drive (SSD), an input/output I/F 4d for connecting a peripheral device such as a display, and a communication I/F 4e for communicating with external devices.

Figure 2:
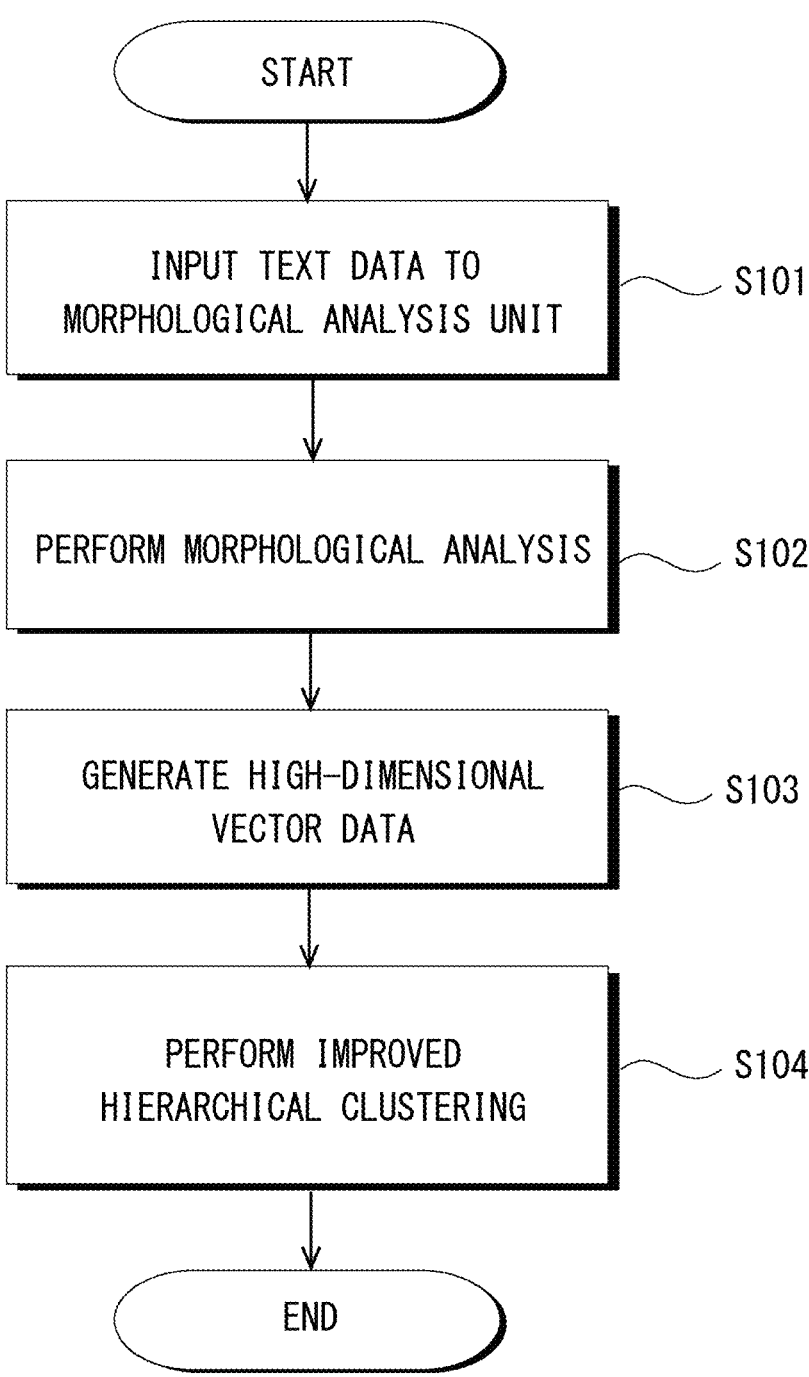
FIG. 2 is a flowchart showing an example of a flow of processes performed by the processing system according to the present embodiment.

FIG. 2 is a flowchart showing an example of a flow of processes performed by the processing system according to this embodiment. Note that the processing system 1 according to this embodiment, for example, is configured to find a common factor that substitutes for the meaning of a text from texts, and is applicable to other natural language processing services (retrieval, document summarization, translation, etc.).

In order to find a common factor of texts, it is necessary to find the similarity between the texts, and for this purpose, words included in the texts are converted into numbers. For the conversion, the processing system 1 according to this embodiment executes the following processes of Steps S101 to S103.

First, for example, text data is input to the morphological analysis unit 2 (Step S101). The morphological analysis unit 2 performs morphological analysis for outputting a unit of a word or a morpheme from the input text data (Step S102).

The relative distance calculation unit 3 maps words and morphemes onto relative positions based on the usage of each language in accordance with the text decomposed into morpheme units by the morphological analysis unit 2, and converts them into numbers. That is, the relative distance calculation unit 3 generates high-dimensional vector data by projecting them onto a high-dimensional vector (e.g., a vector of several hundred dimensions) (Step S103). The relative distance calculation unit 3 outputs the high-dimensional vector data to the information processing system 4.

The information processing system 4 performs an improved hierarchical clustering described later based on the high-dimensional vector output from the relative distance calculation unit 3 (Step S104).

Note that, since a common factor search method by clustering is known, a detailed description thereof will be omitted. For example, as a clustering method, a top-down method (K-center clustering) for performing a division from entire data, and a bottom-up method (hierarchical clustering) for grouping, among pieces of data, two pieces of the data closest to each other and repeating the grouping can be used.

FIG. 3 is a diagram showing a comparison of advantages and disadvantages among the top-down method, the bottom-up method, and the improved hierarchical clustering.

Taking into account the above advantages and disadvantages, the information processing system 4 according to this embodiment performs the improved hierarchical clustering in which the disadvantages of the top-down method are eliminated.

Figure 4:
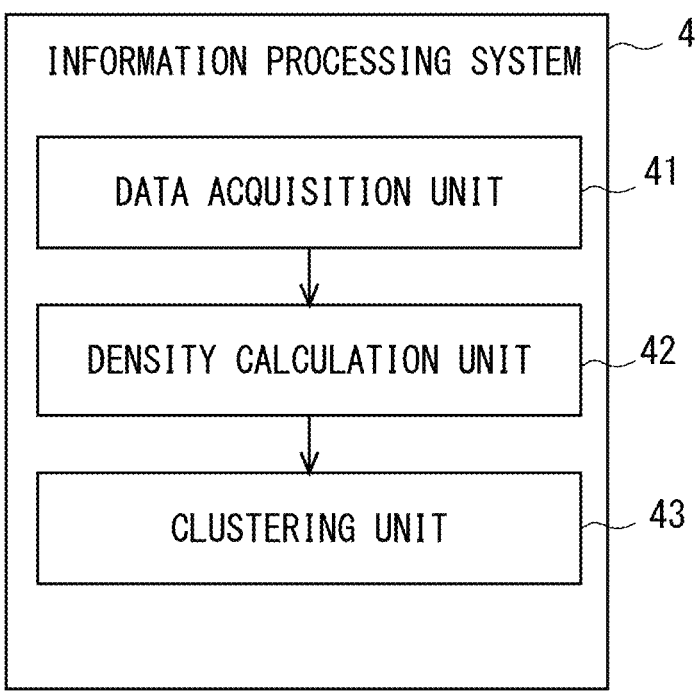
FIG. 4 is a block diagram showing an example of a schematic system configuration of an information processing system according to a present embodiment.

FIG. 4 is a block diagram showing an example of a schematic system configuration of the information processing system according to this embodiment. The information processing system 4 according to this embodiment includes a data acquisition unit 41 that acquires high-dimensional vector data, a density calculation unit 42 that calculates density of each cluster of the high-dimensional vector acquired by the data acquisition unit 41, and a clustering unit 43 that performs hierarchical clustering based on the density of each cluster calculated by the density calculation unit 42.

Figure 5:
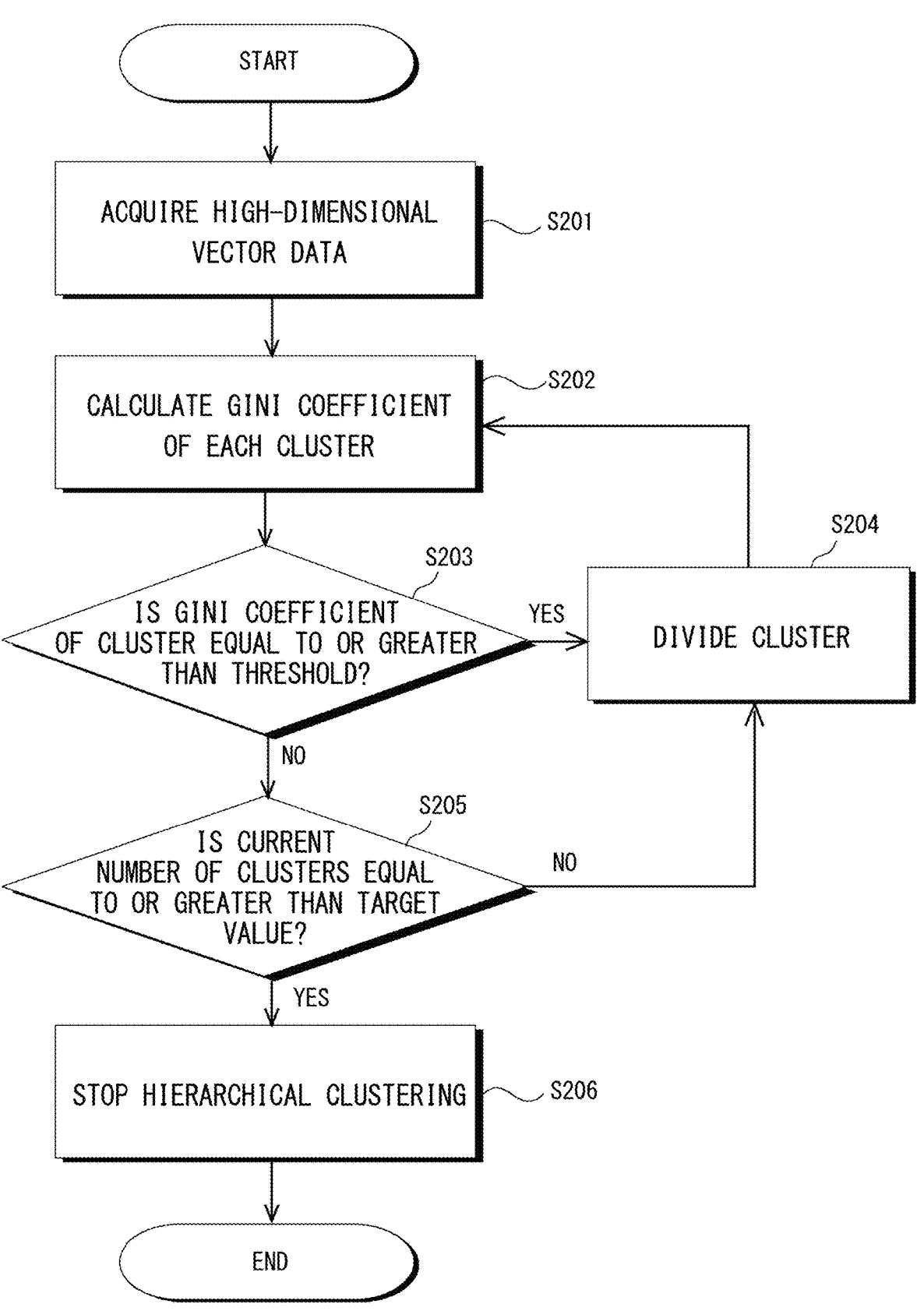
FIG. 5 is a flowchart showing an example of a flow of an information processing method performed by the information processing system according to the present embodiment.

FIG. 5 is a flowchart showing an example of a flow of an information processing method performed by the information processing system according to this embodiment.

The data acquisition unit 41, for example, acquires high-dimensional vector data from the relative distance calculation unit 3 (Step S201).

The density calculation unit 42 calculates, for example, a Gini coefficient of each cluster as the density of each cluster of the high-dimensional vector acquired by the data acquisition unit 41 (Step S202).

The clustering unit 43 determines whether or not the Gini coefficient of each cluster calculated by the density calculation unit 42 is equal to or greater than a threshold (Step S203). Note that a threshold of the Gini coefficient may be set in advance in the clustering unit 43.

When the clustering unit 43 determines that the Gini coefficient of the cluster calculated by the density calculation unit 42 is equal to or greater than a threshold (YES in Step S203), the clustering unit 43 divides the cluster (Step S204), and the process returns to the above step (Step S202).

On the other hand, when the clustering unit 43 determines that the Gini coefficient of each cluster calculated by the density calculation unit 42 is not equal to or greater than a threshold (NO in Step S203), the clustering unit 43 determines whether or not the current number of clusters is equal to or greater than a target value (Step S205). Note that a target value of the number of clusters (the number of common factors) may be set in advance in the clustering unit 43.

When the clustering unit 43 determines that the current number of clusters is equal to or greater than a target value (YES in Step S205), the clustering unit 43 stops hierarchical clustering (Step S206). On the other hand, when the clustering unit 43 determines that the current number of clusters is not equal to or greater than a target value (NO in Step S205), the process returns to the above step (Step S204).

As described above, the information processing system 4 according to this embodiment calculates the density for each cluster of the high-dimensional vector, and repeats a process for dividing clusters which have high densities and in which data is dense until the number of clusters reaches the target number of clusters.

By the improved hierarchical clustering according to this embodiment, a target number of clusters can be set in advance and calculated while avoiding disadvantages such as dependence on initial values and an increase in the amount of calculation. According to this improved hierarchical clustering, for example, words and morphemes can be clustered until the number of clusters reaches the desired number of clusters, and grouped as common factors.

Next, the improved hierarchical clustering performed by the clustering unit 43 described above will be described in more detail. The clustering unit 43 according to this embodiment is characterized in that the calculation load can be greatly reduced for large-scale data without reducing the accuracy.

As described above, when a distance between high-dimensional vectors is obtained without any contrivance of calculation, it is necessary to compare the dimension of the vector with the number of words. However, in all the dimensions, "the distances between words" for creating clusters "are" not necessarily "close to each other", that is, data is not necessarily dense. Therefore, the clustering unit 43 according to this embodiment calculates a Gini coefficient indicating the density of data in each dimension (each vector component) of the high-dimensional vector.

In a vector component having a high Gini coefficient, data is dense. Thus, common factors need to be subdivided by additional clustering. On the other hand, in a vector component having a low Gini coefficient, data is uniformly spread. Thus, common factors can be divided without additional clustering.

Therefore, the clustering unit 43 according to this embodiment concentrates the clustering by the above-described improved hierarchical clustering on a part where data is particularly dense. Next, a method for specifying a part on which the above-described improved hierarchical clustering is concentrated will be described in detail.

Figure 6:
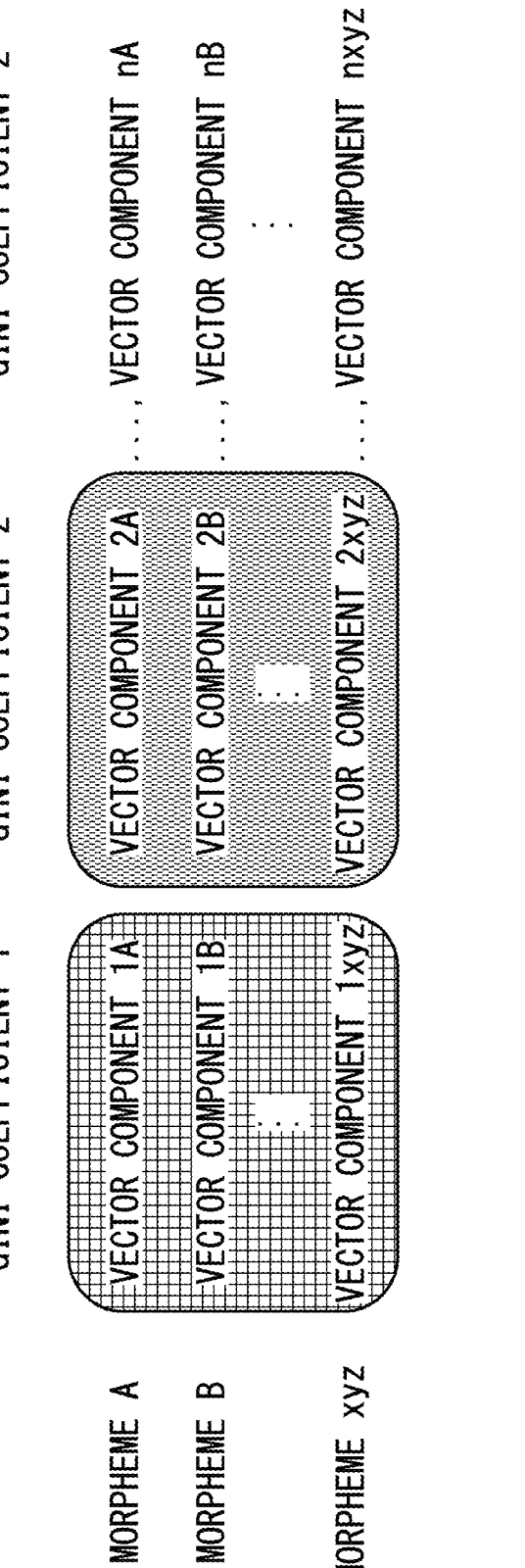
FIG. 6 is a diagram showing an example of a Gini coefficient of each component of a high-dimensional vector after each morpheme is projected onto the high-dimensional vector.

The clustering unit 43 first calculates a Gini coefficient of each vector component based on the high-dimensional vector acquired by the data acquisition unit 41. FIG. 6 is a diagram showing an example of the Gini coefficient of each component of the high-dimensional vector after each morpheme is projected onto the high-dimensional vector.

For example, as shown in FIG. 6, the clustering unit 43 compares the calculated Gini coefficients of each component of the high-dimensional vector. Then the clustering unit 43 extracts, for example, two vectors: a vector $\alpha$ consisting of the vector component having the highest Gini coefficient and a vector $\beta$ consisting of the vector component having the second highest Gini coefficient.

Figure 7:
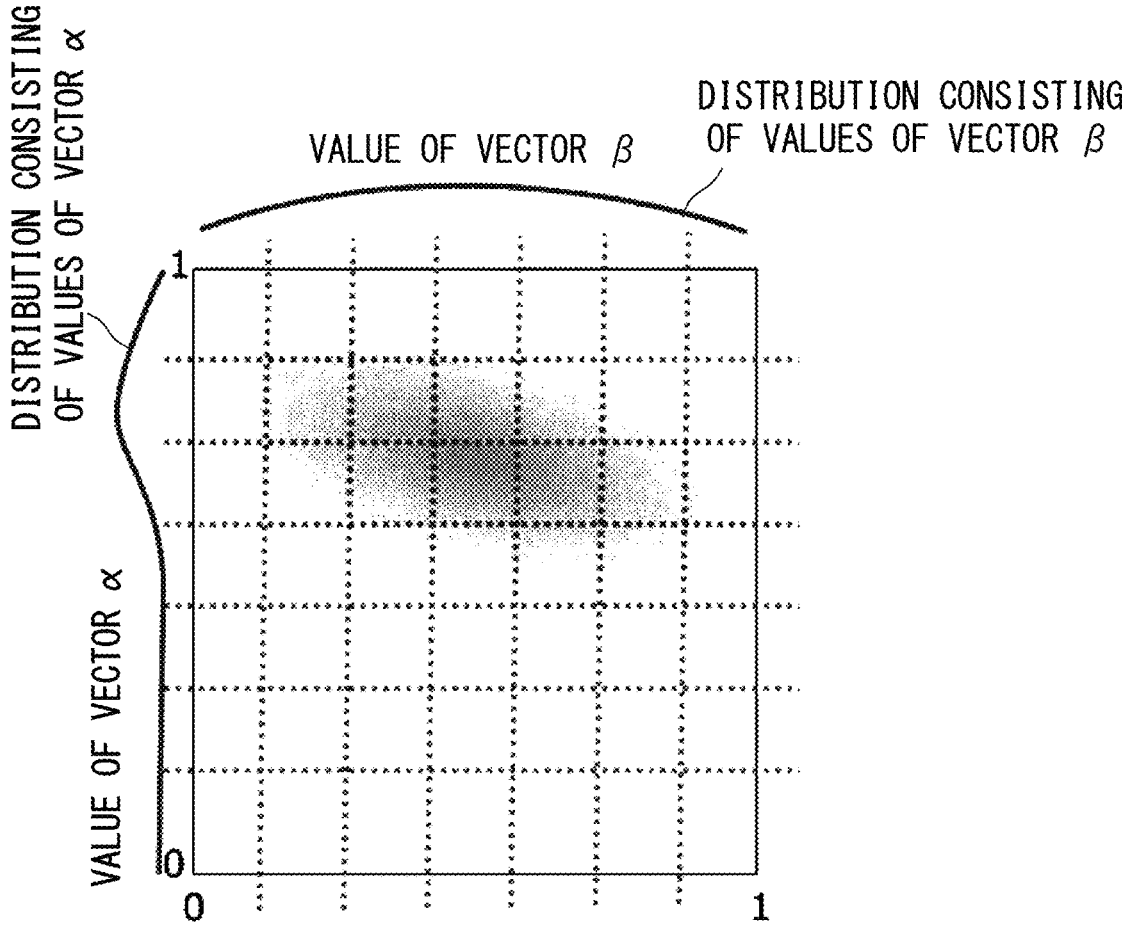
FIG. 7 is an example of a graph showing a simultaneous distribution consisting of vectors a and B.

FIG. 7 is an example of a graph showing a simultaneous distribution consisting of the vectors $\alpha$ and $\beta$. In the simultaneous distribution shown in FIG. 7, a dark-colored area indicates a part in which the vector values are dense, and a light-colored area indicates a part in which the vector values are sparse.

As shown in FIG. 7, the clustering unit 43 obtains a part in which the vector values are dense and a part in which the vector values are sparse, and then determines a part on which the improved hierarchical clustering is concentrated based on the result.

Figure 8:
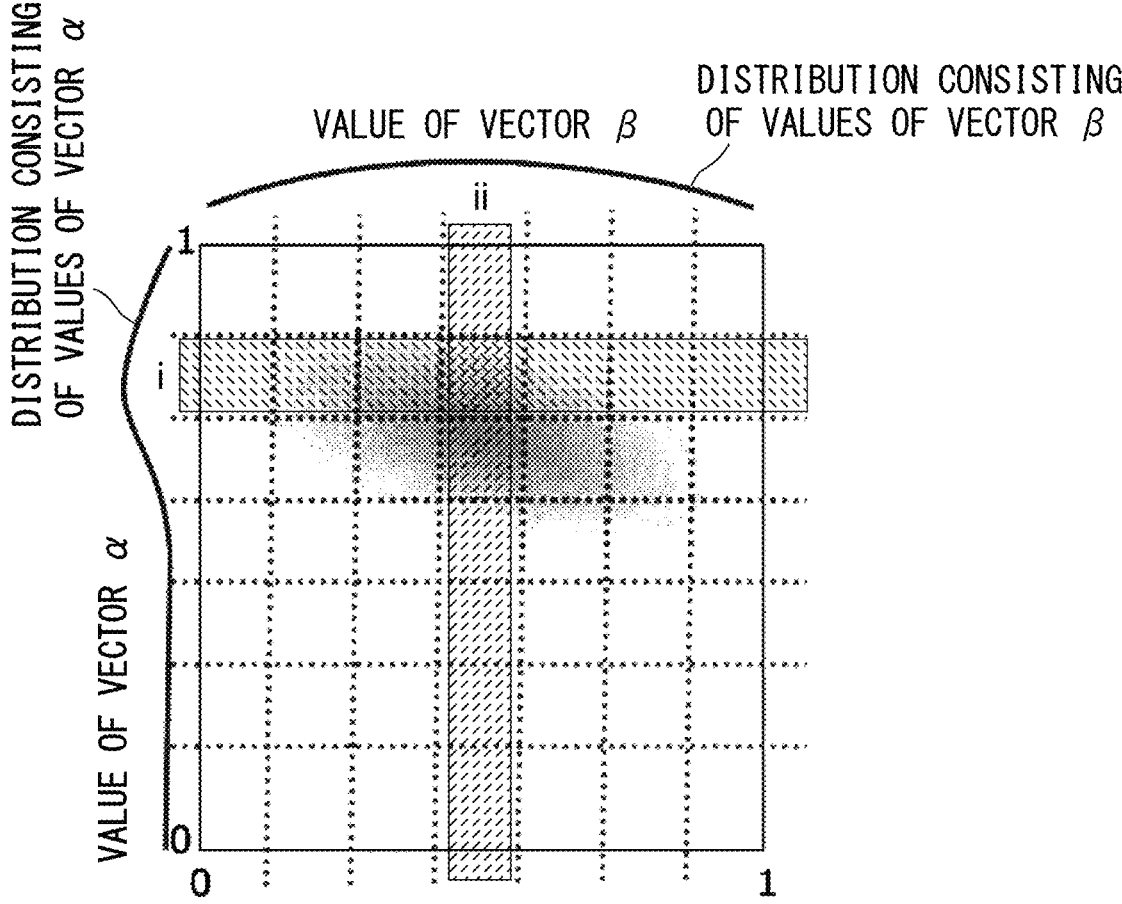
FIG. 8 is a diagram showing an example of a part in which vector values are dense.

FIG. 8 is a diagram showing an example of the part in which the vector values are dense. As shown in FIG. 8, the part in which the vector values are particularly dense is a part i in the component of the vector $\alpha$ and a part ii in the component of the vector $\beta$.

Figure 9:
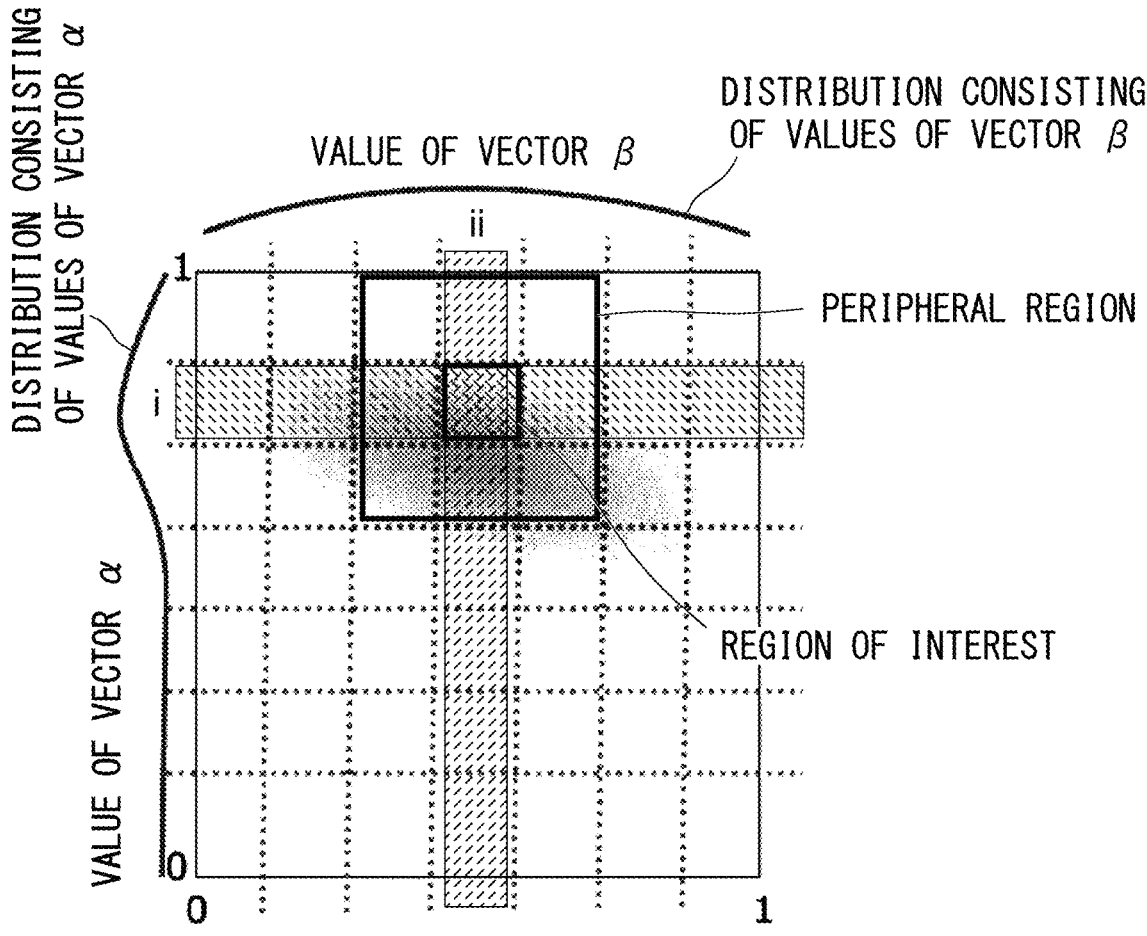
FIG. 9 is a diagram showing an example of a region of interest and a peripheral region.

Note that the clustering unit 43 extracts the parts i and ii in which the vector values are particularly dense so that the intersection of the parts i and ii has a predetermined value. Specifically, the clustering unit 43 extracts the parts i and ii so that the intersection of the parts i and ii is set as a region of interest and the region surrounding the region of interest is set as a peripheral region, and the peripheral region has a predetermined ratio (e.g., 45%) to the entire region. The predetermined ratio may be set experimentally while taking into account, for example, the amount of calculation. FIG. 9 is a diagram showing an example of the region of interest and the peripheral region calculated as described above.

Note that, although the clustering unit 43 extracts two vectors in the above description, it may extract three or more vectors and extract a region of interest and a peripheral region based on the extracted vectors.

The clustering unit 43 intensively performs the improved hierarchical clustering shown in FIG. 5 on the region of interest and the peripheral region extracted as described above. The reason why the hierarchical clustering is performed not only on the region of interest but also on the peripheral region is that it is difficult to appropriately perform clustering on a boundary part of the region of interest. Therefore, the clustering unit 43 according to this embodiment performs the improved hierarchical clustering not only on the region of interest but also on the peripheral region of the region of interest.

Note that when the clustering unit 43 determines that the Gini coefficient of each cluster has reached a predetermined value in the middle of performing the improved hierarchical clustering (e.g., when the clustering unit 43 determines that the number of pieces of data has decreased by about 20%), it may temporarily stop the improved hierarchical clustering. For example, when the clustering unit 43 has temporarily stopped the hierarchical clustering, the clustering unit 43 randomly selects one representative vector included in each cluster.

The clustering unit 43 assigns a name indicating a cluster to each vector included in the cluster. By doing so, the clustering unit 43 can output the number of clusters and a vector (e.g., its name, a morpheme A, etc.) included in the cluster. The clustering unit 43 performs the above output using, for example, a display apparatus or a printer. A user can adjust a threshold or a target value of a Gini coefficient described later in accordance with a result of the output by the clustering unit 43.

Figure 10:
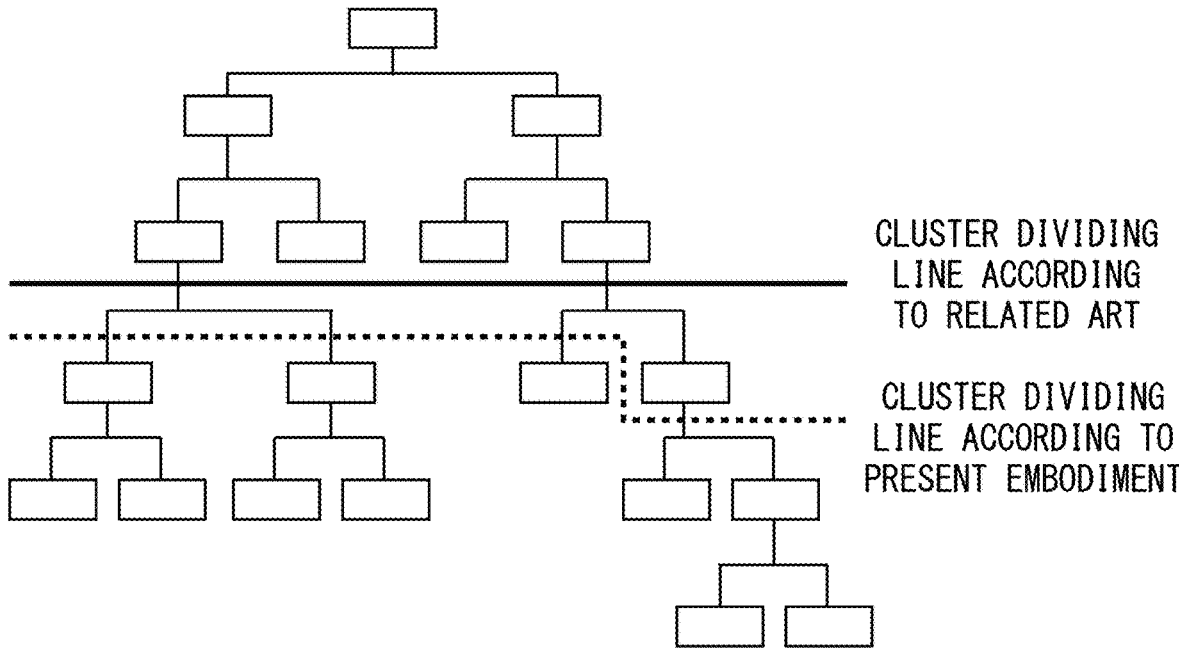
FIG. 10 is a diagram showing a cluster dividing line.

Thus, for example, as shown in FIG. 10, by adjusting a cluster dividing line in accordance with the density of the data, it is possible to minimize the influence of the fluctuation of the density and to divide a dense part more intensively.

The clustering unit 43 resumes the improved hierarchical clustering after the above-described temporary stop, and when the clustering unit 43 determines that the number of clusters has reached a target value, the clustering unit 43 finally stops the improved hierarchical clustering.

Note that the above target value of the number of clusters may be determined, for example, based on how many kinds of meanings consisting of words are to be used. The number of kinds of meanings of words is pseudo-shown. Therefore, the number of clusters of the target value may be increased when the meanings are finely classified, and may be decreased when meanings are roughly classified and synonyms are broadly defined. In this embodiment, for example, 100,000 kinds of meanings are set, and the target value is set to 100,000.

As described above, the information processing system 4 according to this embodiment includes the data acquisition unit 41 that acquires vector data of a plurality of dimensions, the clustering unit 43 that groups, based on relative distances between pieces of the vector data acquired by the data acquisition unit 41, the pieces of the data in which the relative distances therebetween are close to each other, and performs hierarchical clustering for repeating the grouping, and the density calculation unit 42 that calculates density of each of clusters of pieces of the vector data. When the clustering unit 43 performs the hierarchical clustering, the clustering unit 43 divides the clusters whose densities are equal to or greater than a threshold based on the density of each of the clusters calculated by the density calculation unit 42.

By the information processing system 4 according to this embodiment, the density for each cluster of the high-dimensional vector is calculated, and a process for dividing clusters which have high densities and in which data is dense is repeated until the number of clusters reaches the target number of clusters. By doing so, the target number of clusters can be set in advance and calculated while avoiding disadvantages such as dependence on initial values and an increase in the amount of calculation and reducing the calculation load.

Several novel embodiments according to the present disclosure have been described above. However, these embodiments are merely presented as examples and are not intended to limit the scope of the disclosure. These novel embodiments can be implemented in various forms. Further, their components/structures may be omitted, replaced, or modified without departing from the scope and the spirit of the disclosure. These embodiments and modifications thereof are included in the scope and the spirit of the disclosure and also included in the disclosure specified in the claims and the scope equivalent thereto.

Note that, in the above embodiments, when the clustering unit 43 performs hierarchical clustering, the clustering unit 43 divides clusters which have high densities equal to or greater than a threshold and in which vector data is dense based on the density of each of the cluster calculated by the density calculation unit 42. However, the present disclosure is not limited thereto. For example, when the clustering unit 43 performs hierarchical clustering, the clustering unit 43 may integrate clusters which have low densities lower than a threshold and in which vector data is sparse based on the density of each of the clusters calculated by the density calculation unit 42.

As described above, the density for each cluster of the high-dimensional vector is calculated, and a process for integrating clusters which have low densities and in which data is sparse is repeated until the number of clusters reaches the target number of clusters. By doing so, as in the case where clusters are divided, the target number of clusters can be set in advance and calculated while avoiding disadvantages such as dependence on initial values and an increase in the amount of calculation and reducing the calculation load.

In the present disclosure, processing shown in FIG. 5 can also be implemented by causing a processor to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), a CD-ROM (Read Only Memory), a CD-R, a CD-R/W, and semiconductor memories (such as a mask ROM, a PROM (Programmable ROM), an EPROM (Erasable PROM), a flash ROM, a RAM (Random Access Memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires and optical fibers) or a wireless communication line.

Each of the units composing the information processing system 4 according to the above-described embodiments can be implemented by the program; some or all of these units also can be implemented by dedicated hardware such as an Application Specific Integrated Circuit (ASIC) or a Field-Programmable Gate Array (FPGA).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information processing system comprising:
data acquisition means for acquiring vector data of a plurality of dimensions;
clustering means for grouping, based on relative distances between pieces of the vector data acquired by the data acquisition means, the pieces of the data in which the relative distances therebetween are close to each other, and performing hierarchical clustering for repeating the grouping; and
density calculation means for calculating density of each of clusters of the pieces of the vector data,
wherein the clustering means divides or integrates the clusters based on the density of each of the clusters calculated by the density calculation means when the clustering means performs the hierarchical clustering; and
wherein the data acquisition means acquires the vector data by:
performing morphological analysis for outputting a unit of a word and a morpheme from input text data;
mapping the word and the morpheme onto relative positions based on usage of each language in accordance with text decomposed into morpheme units; and
converting the words and the morphemes into numbers to generate the vector data.

2. The information processing system according to claim 1, wherein the clustering means extracts at least two vectors by comparing densities of vector components of the vector data of a plurality of dimensions with each other, extracts from each of the extracted vectors dense parts in which vector values are dense, extracts from each of the extracted vectors a region of interest onto which clustering is concentrated based on the extracted dense parts, and performs the hierarchical clustering on the extracted region of interest and a peripheral region surrounding the region of interest.

3. The information processing system according to claim 1, wherein when the clustering means determines that the density of each of the clusters calculated by the density calculation means is equal to or greater than a threshold, the clustering means divides the cluster, and when the clustering means determines that the density of each of the clusters is not equal to or greater than a threshold, the clustering means determines whether or not the current number of the clusters is equal to or greater than a target value, and then when the clustering means determines that the current number of the clusters is equal to or greater than the target value, the clustering means stops the hierarchical clustering.

4. The information processing system according to claim 1, wherein when the clustering means determines that the density of each of the clusters has reached a predetermined value during the hierarchical clustering, the clustering means temporarily stops the hierarchical clustering and outputs the current number of the clusters and vectors included in each of the clusters.

5. The information processing system according to claim 1, wherein the density is a Gini coefficient.

6. The information processing system according to claim 1, wherein the data acquisition means, clustering means, and the density calculation means are a processor.

7. The information processing system according to claim 2, wherein the data acquisition means, clustering means, and the density calculation means are a processor.

8. The information processing system according to claim 3, wherein the data acquisition means, clustering means, and the density calculation means are a processor.

9. The information processing system according to claim 4, wherein the data acquisition means, clustering means, and the density calculation means are a processor.

10. The information processing system according to claim 5, wherein the data acquisition means, clustering means, and the density calculation means are a processor.

11. An information processing method comprising:

acquiring vector data of a plurality of dimensions;

grouping, based on relative distances between pieces of the acquired vector data, the pieces of the data in which the relative distances therebetween are close to each other, and performing hierarchical clustering for repeating the grouping;

calculating density of each of clusters of the pieces of the vector data;

dividing or integrating the clusters based on the calculated density of each of the clusters when the hierarchical clustering is performed;

performing morphological analysis for outputting a unit of a word and a morpheme from input text data;

mapping the word and the morpheme onto relative positions based on usage of each language in accordance with text decomposed into morpheme units; and converting the words and the morphemes into numbers to generate the vector data.

12. A non-transitory computer-readable medium storing a program for causing a computer to:

acquire vector data of a plurality of dimensions;

group, based on relative distances between pieces of the acquired vector data, the pieces of the data in which the relative distances therebetween are close to each other, and perform hierarchical clustering for repeating the grouping;

calculate density of each of clusters of the pieces of the vector data;

divide or integrate the clusters based on the calculated density of each of the clusters when the hierarchical clustering is performed;

perform morphological analysis for outputting a unit of a word and a morpheme from input text data;

map the word and the morpheme onto relative positions based on usage of each language in accordance with text decomposed into morpheme units; and convert the words and the morphemes into numbers to generate the vector data.

* * * * *